United States Patent [19]

Kawachi

[11] Patent Number: 4,767,679

[45] Date of Patent: Aug. 30, 1988

[54] THIN FILM EL PANEL

[75] Inventor: Kazuhiko Kawachi, Furukawa, Japan

[73] Assignee: Alps Electric Co., Ltd., Japan

[21] Appl. No.: 86,373

[22] Filed: Aug. 17, 1987

[30] Foreign Application Priority Data

Oct. 22, 1986 [JP] Japan ............................... 61-250983

[51] Int. Cl.⁴ ............................ B32B 9/00; H01J 1/62

[52] U.S. Cl. .................................... 428/690; 428/691; 428/917; 313/503; 313/504; 313/505; 313/506; 313/512

[58] Field of Search ........................ 428/690, 691, 917; 313/503-506, 512

[56] References Cited

U.S. PATENT DOCUMENTS 3,346,758 10/1967 Dell .................................... 313/512
4,020,389 4/1977 Dickson et al. ..................... 313/512
4,593,228 6/1986 Albrechtson et al. ............. 313/512
4,647,337 3/1987 Simozoulos et al. ............... 756/633

FOREIGN PATENT DOCUMENTS 0188881 7/1986 European Pat. Off. ............ 313/512
0083196 6/1986 Japan .................................. 313/512

*Primary Examiner*—John E. Kittle
*Assistant Examiner*—Patrick J. Ryan
*Attorney, Agent, or Firm*—Guy W. Shoup; Paul J. Winters; Leighton K. Chong

[57] ABSTRACT

A thin film EL panel including at least a transparent electrode, an EL luminescent layer, an insulating layer and an opposite electrode laminated on a transparent insulating substrate, wherein the thin-film-formed side of the substrate is sealed by a moisture-proof film with a thermoplastic resin interposed between them.

2 Claims, 1 Drawing Sheet

THIN FILM EL PANEL

BACKGROUND OF THE INVENTION

1. Field of the Invention

The present invention relates to a thin film EL panel comprising forming an EL luminescent layer between a transparent electrode and an opposite electrode and applying voltage to the EL luminescent layer to cause this layer to emit light.

2. Prior Art

The conventional thin film EL panel is of the 6-layer construction having double insulating films and comprising forming a transparent electrode 2, an insulating layer 3, an EL luminescent layer 4, an insulating layer 5 and an opposite electrode 6 on a glass substrate 1 in this order, as shown in FIG. 2. When alternating electric field of several tens Hz to several KHz is applied between the transparent electrode 2 and the opposite electrode 6 in the case of this thin film EL panel, color centers in the EL luminescent layer 4 are excited to emit light. The thin film EL display element of this type has been used as a display for various kinds of devices.

In the case of this thin film EL panel, however, it was sensitive to humidity and when it contacted humidity, its life became extremely short. Therefore, various kinds of measures for preventing water intrusion have been employed.

As shown in FIG. 2, for example, a glass cap 7 seals the thin-film-formed side of the glass substrate 1. Or Oil 8 such as silicon oil is filled in the glass cap 7.

In the case of these thin film EL panels, however, their costs became high and their assembling workability was low because the glass cap 7 was used. When they were sealed only by the glass cap 7, they were influenced by water entering into spaces in the glass cap 7 to deteriorate their luminance and not to make their lives sufficiently long. Even when oil 8 was filled in the glass cap 7, its effect was not sufficient because oil was more likely to pass water therethrough as compared with solid.

Therefore, it has been proposed that a hygroscopic agent is arranged in the glass cap 7, but because the glass cap 7 was U-shaped, it was impossible to fill the hygroscopic agent in the glass cap 7 without any space left and sufficient effect could not be achieved accordingly.

SUMMARY OF THE INVENTION

The object of the present invention is therefore to provide a thin film EL panel capable of sealing the thin-film-formed side of a substrate at lower cost and with more excellent workability and preventing water intrusion with more reliability.

According to the present invention, there can be provided a thin film EL panel including at least a transparent electrode, an EL luminescent layer, an insulating layer and an opposite electrode laminated in this order on a transparent insulating substrate, wherein the thin-film-formed side of the substrate is sealed by a moisture-proof film with a thermoplastic resin interposed between them.

As described above, the thin-film-formed side of the substrate is sealed by the moisture-proof film with the thermoplastic resin interposed between them. Therefore, its cost can be made lower as compared with the glass cap, because the material cost of the moisture-proof film is about a tenth of that of the glass cap. In addition, the sealing can be achieved by closely contacting the moisture-proof film on the substrate with the melt thermoplastic resin interposed between them. Its workability is therefore made excellently high and it is suitable for mass production. Further, the thin-film-formed side of the substrate can be sealingly coated by the moisture-proof film even at the periphery thereof, thereby enabling more reliable moisture-proof effect to be attained.

According to a preferred embodiment of the present invention, a metal laminate film or fluorocarbon resin film is used as the moisture-proof film. The metal laminate film is of the complex type comprising bonding a resin film and a metal foil. A polyester resin film or the like can be used as the resin film and an aluminum foil can be used as the metal foil in this case. In order to make the moisture-proof effect more reliable, it is preferable to make the metal foil 10 um or more thick. The metal laminate film can be made to have 2 or 3 and more layers and particularly when it consists of three layers comprising sandwiching a metal foil between resin films, electric insulation can be made better. The fluorocarbon resin film can provide same moisture-proof effect by itself as the metal laminate film can.

According to the preferred embodiment of the present invention, resins such as ethylene-vinyl acetate copolymer, noryl, unsaturated polyester (FH245 made by Dainippon Ink & Chemicals Inc., for example), vinylidene fluoride-6 polypropylene fluoride copolymer, low-density polyethylene, highdensity polyethylene, vinylidene chloride and polypropylene can be used as the thermoplastic resin interposed between the substrate and the moisture-proof film. When these thermoplastic resins are used, better moisture-proof effect can be attained.

A thin film EL panel of the present invention can be easily made by successively laminating a transparent electrode, an insulating layer, an EL luminescent layer, an insulating layer, an opposite electrode and the like on a transparent insulating substrate such as glass according to the usual manner, arranging a thermoplastic resin on the thin-film-formed side of the substrate and melting it under heating atmosphere, bonding a moisture-proof film on it under vacuum degassing, and pressing the periphery of the moisture-proof film with the heat block.

DETAILED DESCRIPTION OF THE PREFERRED EMBODIMENT

Figure 1:
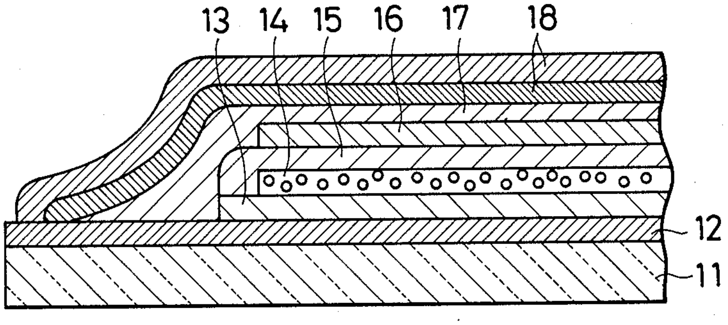
FIG. 1 is a sectional view showing an example of the thin film EL panel according to the present invention.

FIG. 1 shows an example of the thin film EL panel according to the present invention. This thin film EL panel is made as follows:

An ITO film is formed, 500–1000 Å thick, on a nonalkalic glass substrate 11 according to the sputtering method and etched by acid to a desired pattern to form a transparent electrode 12. An insulating layer 13 consisting of $Y_2O_5$ is formed, 2000–5000 Å thick, on it according to the same method. An EL luminescent layer 14 consisting of ZnS and Mn is then formed, 2000–5000 Å thick, on the insulating layer 13. An insulating layer 15 consisting of $Y_2O_5$ and similar to the above one is formed on the EL luminescent layer 14. An Al film is formed, 500–1000 Å thick, on the insulating layer 15 and etched to a desired pattern to form an opposite electrode 16. If necessary, $SiO_2$ is formed, about 1 μm thick, on the opposite electrode 16 to serve as a moisture-proof passivation film (not shown). A thermoplastic resin 17 such as ethylene and vinyl acetate copolymer resin (EVA) and then a moisture-proof film such as complex film made of polyester resin film and aluminum foil are mounted on the above thin-film-formed side of the substrate, introduced into a vacuum and heated to 150° to melt the thermoplastic resin 17 and bond the moisture-proof film 18. The periphery of the moisture-proof film 18 is then heated to 150° and press-bonded by the die.

Figure 2:
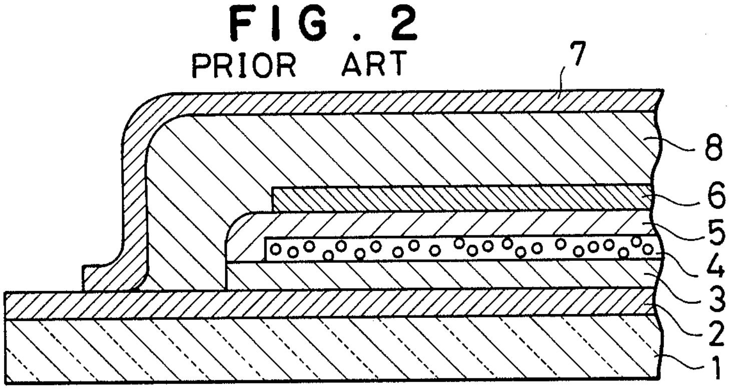
FIG. 2 PRIOR ART
FIG. 2 is a sectional view showing one of the conventional thin film EL panels.

The thin film EL panel was successively turned on at a temperature of 40° C. and under a humidity of 90%. It took 5000 hours for its luminance brightness to become 50% lower than its initial luminance brightness. Same test was conducted relating to the thin film EL panel which was made by coating the thin-film-formed side of the substrate with the glass cap 7 and filling silicon oil 8 inside the glass cap 7, as shown in FIG. 2. It took 4000 hours for the luminance brightness of this conventional thin film EL panel to become 50% lower than its initial luminance brightness. It can be therefore understood that the thin film EL panel of the present invention has a life not inferior to that of the conventional one.

According to the present invention as described above, the thin-film-formed side of a substrate is sealed by a moisture-proof film with a thermoplastic resin interposed between them. Therefore, sufficient moisture-proof effect can be attained and its life can be made longer. In addition, the moisture-proof film used is extremely lower in cost as compared with the glass cap and its workability makes it suitable for mass production.

I claim:

1. In a thin film EL panel including at least a transparent electrode, an EL luminescent layer, an insulating layer and an opposite electrode laminated on one side of a transparent insulating substrate, the improvement wherein said electrodes and layers of said thin film EL panel are encapsulated in an inner layer made of a thermoplastic resin, and sealed by an outer, moisture-proof film made of a metal laminate formed thereover having its periphery press-bonded to said substrate.

2. A thin film EL panel according to any of claim 1 wherein said thermoplastic resin is selected from ethylenevinyl acetate copolymer, noryl, unsaturated polyester, vinylidene fluoride-6 propylene fluoride copolymer, low-density polyethylene, high-density polyethylene, vinylidene chloride and polypropylene.

* * * * *